(12) United States Patent
Commault et al.

(10) Patent No.: US 10,507,708 B2
(45) Date of Patent: Dec. 17, 2019

(54) VERTICAL SLIDING SOLUTION OF THE CONDENSER UNIT FOR TRUCKS WITH REFRIGERATED GOODS

(71) Applicant: Carrier Corporation, Jupiter, FL (US)

(72) Inventors: Ronan Commault, Darnetal (FR); David Vericel, Amfreville la mivoie (FR); Ludovic Lanuzel, Bonsecours (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 9 days.

(21) Appl. No.: 15/116,107

(22) PCT Filed: Feb. 3, 2014

(86) PCT No.: PCT/IB2014/000270
§ 371 (c)(1),
(2) Date: Aug. 2, 2016

(87) PCT Pub. No.: WO2015/114396
PCT Pub. Date: Aug. 6, 2015

(65) Prior Publication Data
US 2017/0080780 A1    Mar. 23, 2017

(51) Int. Cl.
*B60H 1/32* (2006.01)
*B60P 3/20* (2006.01)
(Continued)

(52) U.S. Cl.
CPC ....... *B60H 1/3232* (2013.01); *B60H 1/00014* (2013.01); *B60H 1/3229* (2013.01);
(Continued)

(58) Field of Classification Search
CPC ........ B60P 3/20; F25D 19/003; F25D 23/067; B60H 1/3232; B60H 1/00014; B60H 1/3229; B60H 2001/3276; B62D 33/067
(Continued)

(56) References Cited

U.S. PATENT DOCUMENTS 3,917,310 A * 11/1975 Mitsuishi ................ B60R 21/11
280/756
4,109,485 A    8/1978 Grosskopf
(Continued)

FOREIGN PATENT DOCUMENTS

DE    3227381 A1    1/1984
DE    3806911 A1    9/1989
(Continued)

OTHER PUBLICATIONS

International Search Report and Written Opinion for Application No. PCT/IB2014/000270 dated Nov. 17, 2014; 12 pgs.
(Continued)

*Primary Examiner* — Melvin Jones
(74) *Attorney, Agent, or Firm* — Cantor Colburn LLP

(57) ABSTRACT

A truck (10) is provided including an engine (12), a cabin, and a conditioned spaced (14) defined by a plurality of adjacent wall members including a front wall member (16). A transport refrigeration unit is configured to control a temperature within the conditioned space include an evaporator unit (20) and a condenser unit (22). The evaporator unit (20) is mounted within the conditioned space (14). The condenser unit (22) is operably coupled to the evaporator unit (20) and is mounted to an exterior surface (24) of the front wall member (16). The condenser unit (22) is configured to move slidably between an operating position and a clearance position.

17 Claims, 7 Drawing Sheets

(51) Int. Cl.
*B60H 1/00* (2006.01)
*F25D 19/00* (2006.01)
*B62D 33/067* (2006.01)
*F25D 23/06* (2006.01)

(52) U.S. Cl.
CPC .............. *B60P 3/20* (2013.01); *B62D 33/067* (2013.01); *F25D 19/003* (2013.01); *B60H 2001/3276* (2013.01); *F25D 23/067* (2013.01)

(58) Field of Classification Search
USPC .......................................................... 62/239
See application file for complete search history.

(56) References Cited

U.S. PATENT DOCUMENTS

| | | | |
|---|---|---|---|
| 4,811,569 A | 3/1989 | Welch et al. | |
| 5,186,015 A | 2/1993 | Roehrich et al. | |
| 5,582,025 A * | 12/1996 | Dubin | F24F 1/0003 248/544 |
| 6,279,334 B1 * | 8/2001 | Ishikawa | B60H 1/3232 62/239 |
| 6,357,248 B1 | 3/2002 | Bongaards et al. | |
| 6,374,626 B1 | 4/2002 | Takahashi | |
| 7,472,946 B2 | 1/2009 | Hollenbeck et al. | |
| 7,921,659 B2 | 4/2011 | Quesada et al. | |
| 8,286,437 B2 * | 10/2012 | Sanders | F25D 29/003 62/234 |
| 8,590,330 B2 * | 11/2013 | Walker | F25D 29/003 62/236 |
| 2006/0152119 A1 * | 7/2006 | Park | F25D 23/067 312/404 |
| 2008/0179489 A1 | 7/2008 | Renken et al. | |
| 2012/0193109 A1 | 8/2012 | Moore et al. | |

FOREIGN PATENT DOCUMENTS

| | | |
|---|---|---|
| DE | 202008012202 U1 | 1/2009 |
| EP | 0366616 A1 | 5/1990 |
| EP | 1957347 A1 | 8/2008 |
| EP | 2163415 A2 | 3/2010 |
| EP | 2442055 A1 | 4/2012 |
| GB | 1338300 A | 11/1973 |
| JP | H0999773 A | 4/1997 |

OTHER PUBLICATIONS

CN Office Action with translation issued in Chinese Patent Application No. 2014800748218 dated Feb. 2, 2018, 28 pages.
Dai, Wen-hui., "Structure and Maintanence of Air Conditioners of Imported Vehicle", Chong Qing Press, Dec. 31, 1998, 8 pp.
Second Office Action Issued by the State Intellectual Property Office of the People's Republic of China dated Aug. 24, 2018, for Application No. 2014800748218 (24 pp.).

* cited by examiner

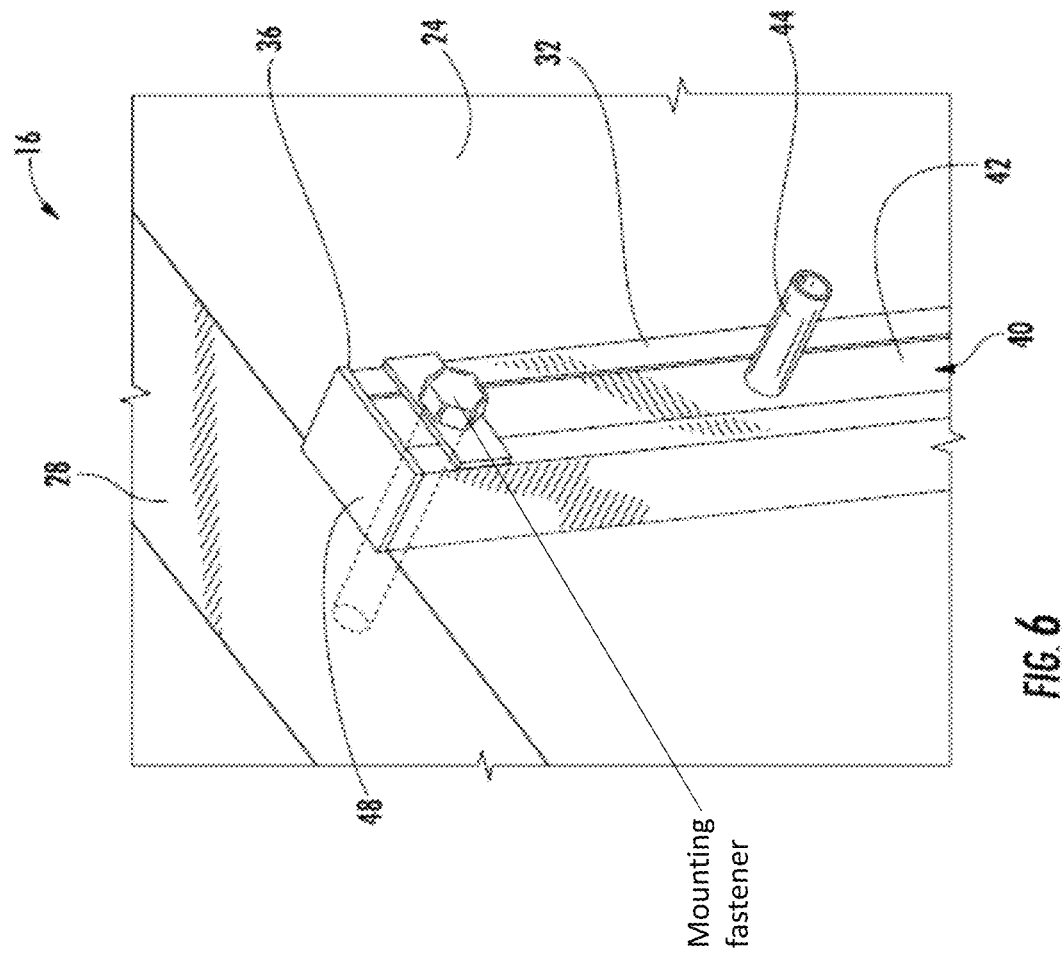
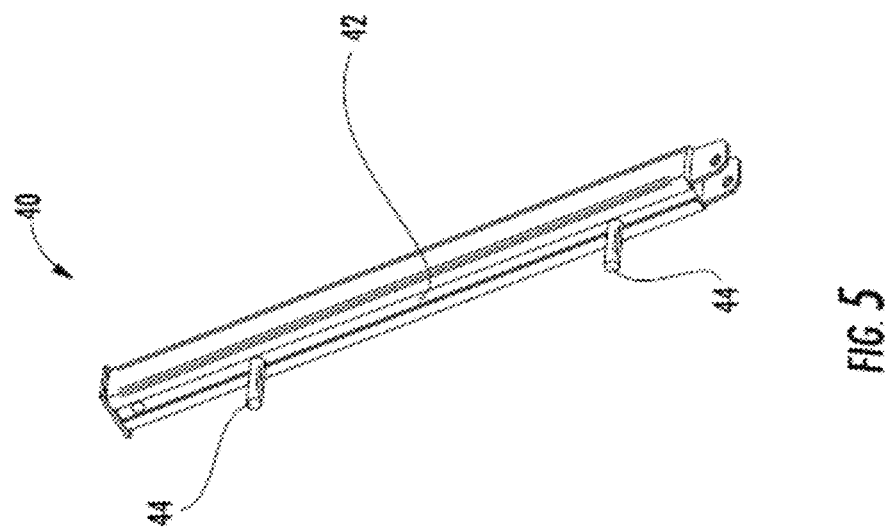

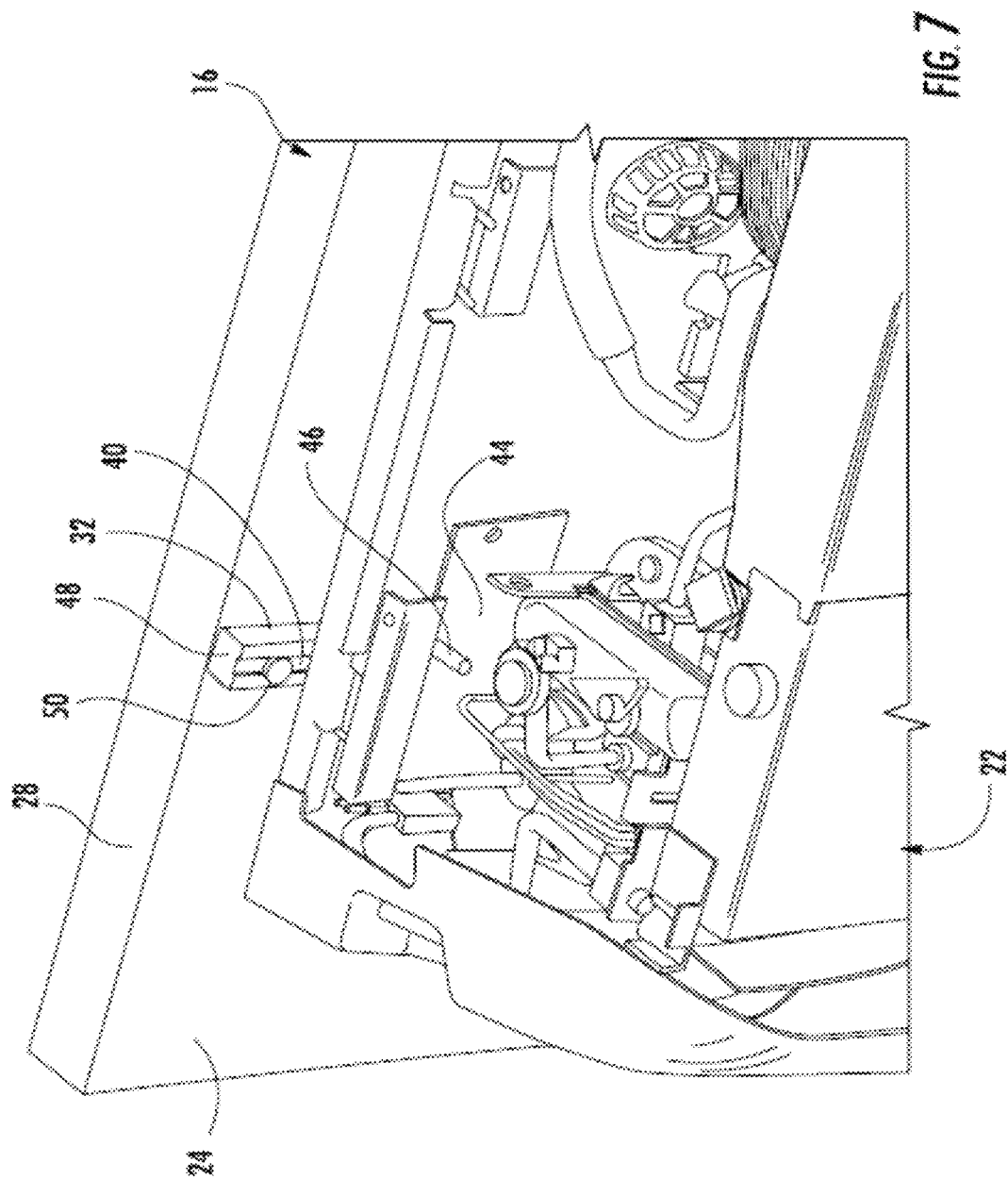

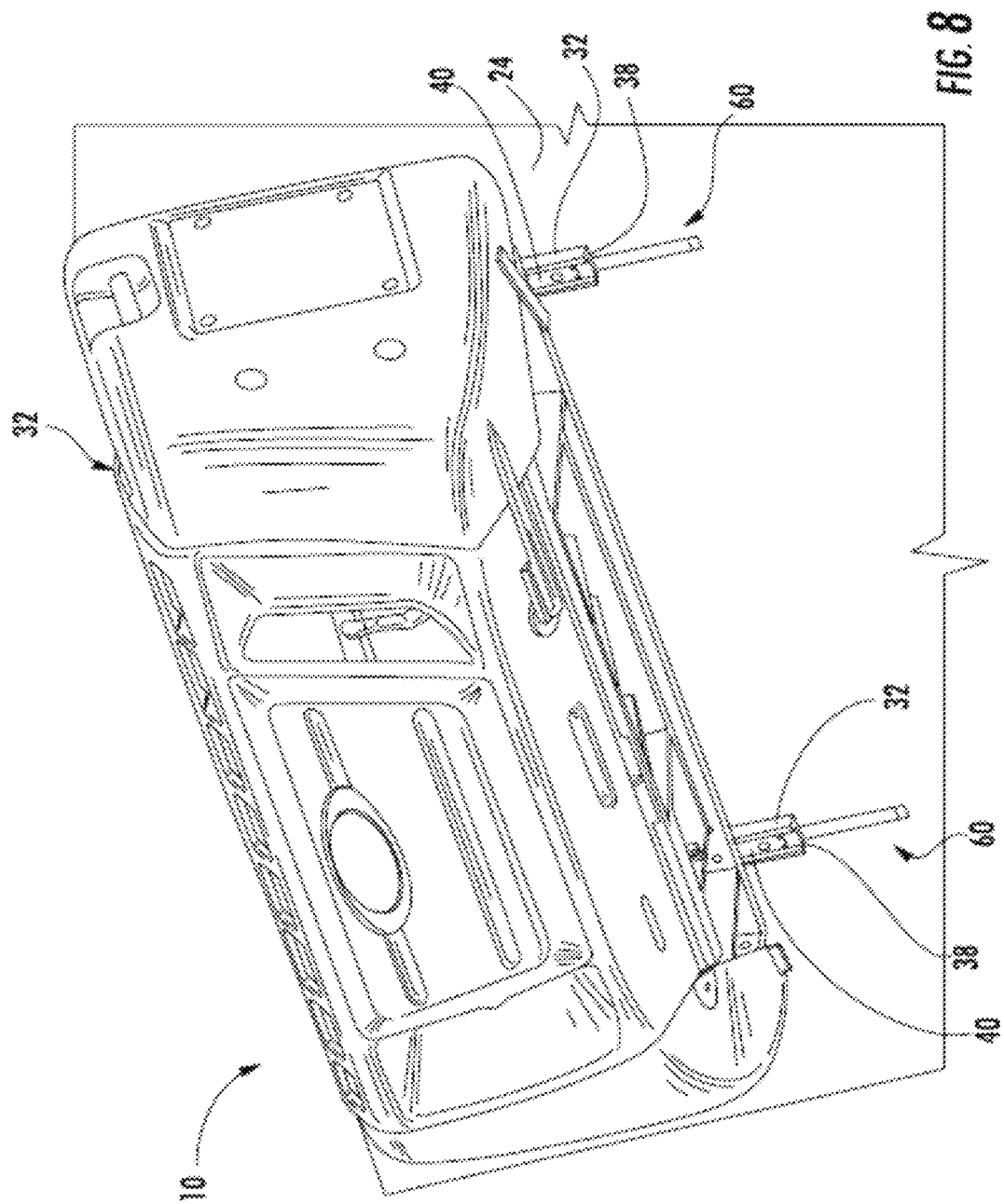

VERTICAL SLIDING SOLUTION OF THE CONDENSER UNIT FOR TRUCKS WITH REFRIGERATED GOODS

CROSS REFERENCE TO RELATED APPLICATIONS

This application is a US National Stage of PCT Application No. PCT/IB2014/000270, filed on Feb. 3, 2014, the disclosure of which is incorporated herein by reference.

BACKGROUND OF THE INVENTION

The invention relates generally to refrigeration systems and, more particularly, to a transport refrigeration system suitable for controlling the temperature of a conditioned space of a vehicle.

Transport refrigeration systems for straight trucks and delivery vans commonly utilize separate condenser and evaporator sections or units. The evaporator unit is generally mounted in a conditioned space associated with the vehicle and the condenser unit is generally mounted on the nose or front wall of a straight truck, above the cabin.

To perform maintenance on the engine of the truck, the cabin is pivoted forward, away from the conditioned space. In many systems, a sufficient clearance exists between the top of the cabin and the condenser unit, allowing the cabin to pivot freely. However, the overall cabin height of some newer vehicles has been increased to improve driver comfort and to be compliant with European emission regulation Euro 6. As a result of this increased cabin height, the condenser unit extends into the path of rotation of the cabin. This interference limits the rotation of the cabin and therefore the access for performing maintenance on the engine.

BRIEF DESCRIPTION OF THE INVENTION

According to an aspect of the invention, a truck is provided including an engine, a cabin, and a conditioned spaced defined by a plurality of adjacent wall members including a front wall member. A transport refrigeration unit is configured to control a temperature within the conditioned space include an evaporator unit and a condenser unit. The evaporator unit is mounted within the conditioned space. The condenser unit is operably coupled to the evaporator unit and is mounted to an exterior surface of the front wall member. The condenser unit is configured to move between an operating position and a clearance position.

According to another aspect of the invention, a method of moving a condenser unit of a transport refrigeration system between an operating position and a clearance position is provided. The condenser unit includes a slide member slidably coupled to a support bracket mounted to a front wall member of a truck. The condenser unit is moved by operating a device coupled to the slide member to move the slide member relative to the support bracket along a slide axis.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a perspective view of a slide member according to an embodiment of the invention;

FIG. 6 is a top perspective view of a slide member arranged within a support bracket according to an embodiment of the invention;

FIG. 7 is a top perspective view of the condenser unit in an operating position according to an embodiment of the invention;

FIG. 8 is a bottom perspective view of the condenser unit mounted to the front wall member according to an embodiment of the invention.

DETAILED DESCRIPTION OF THE INVENTION

Figure 1:
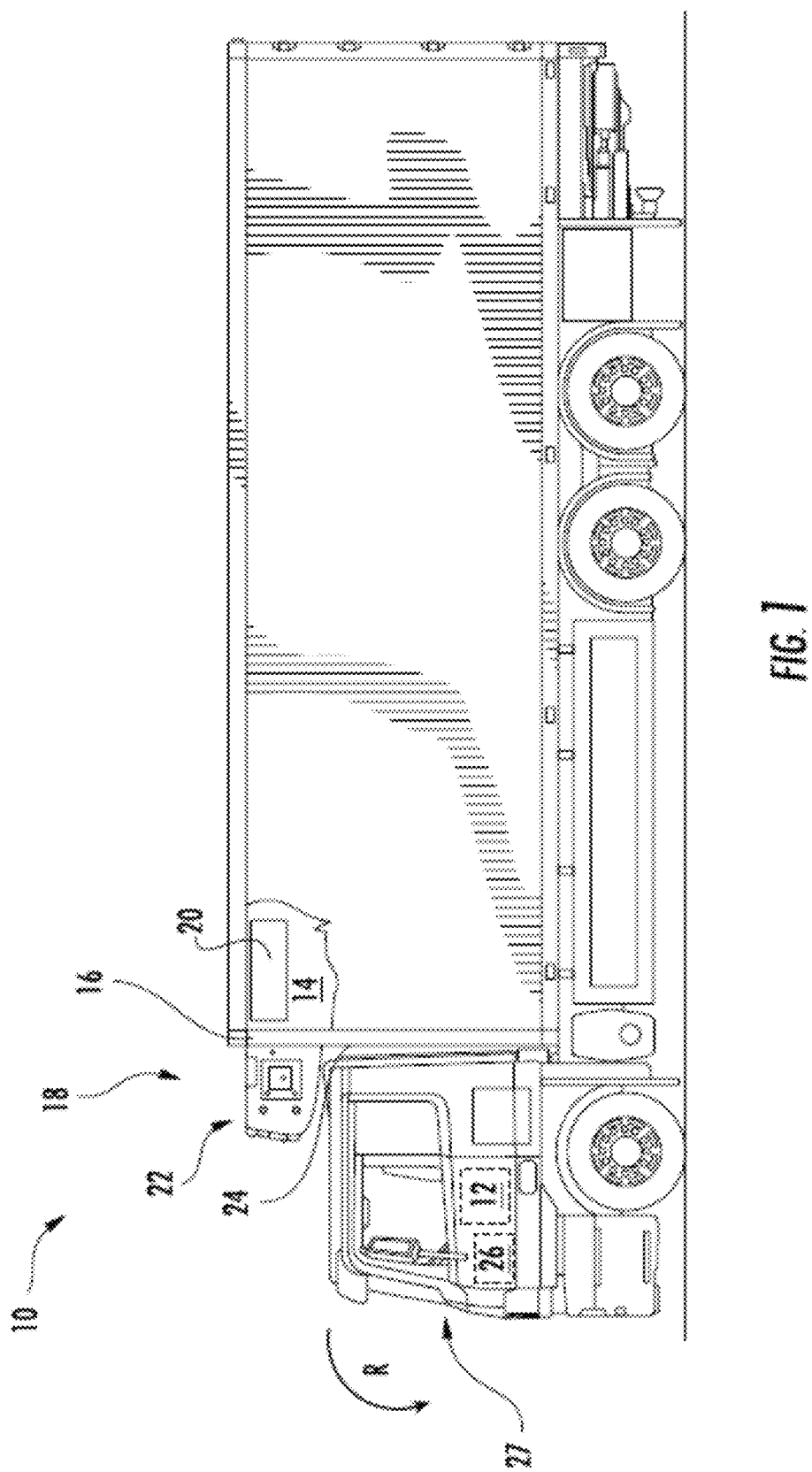
FIG. 1 is a side view of a portion of a truck including a transportation refrigeration system.
Figure 2:
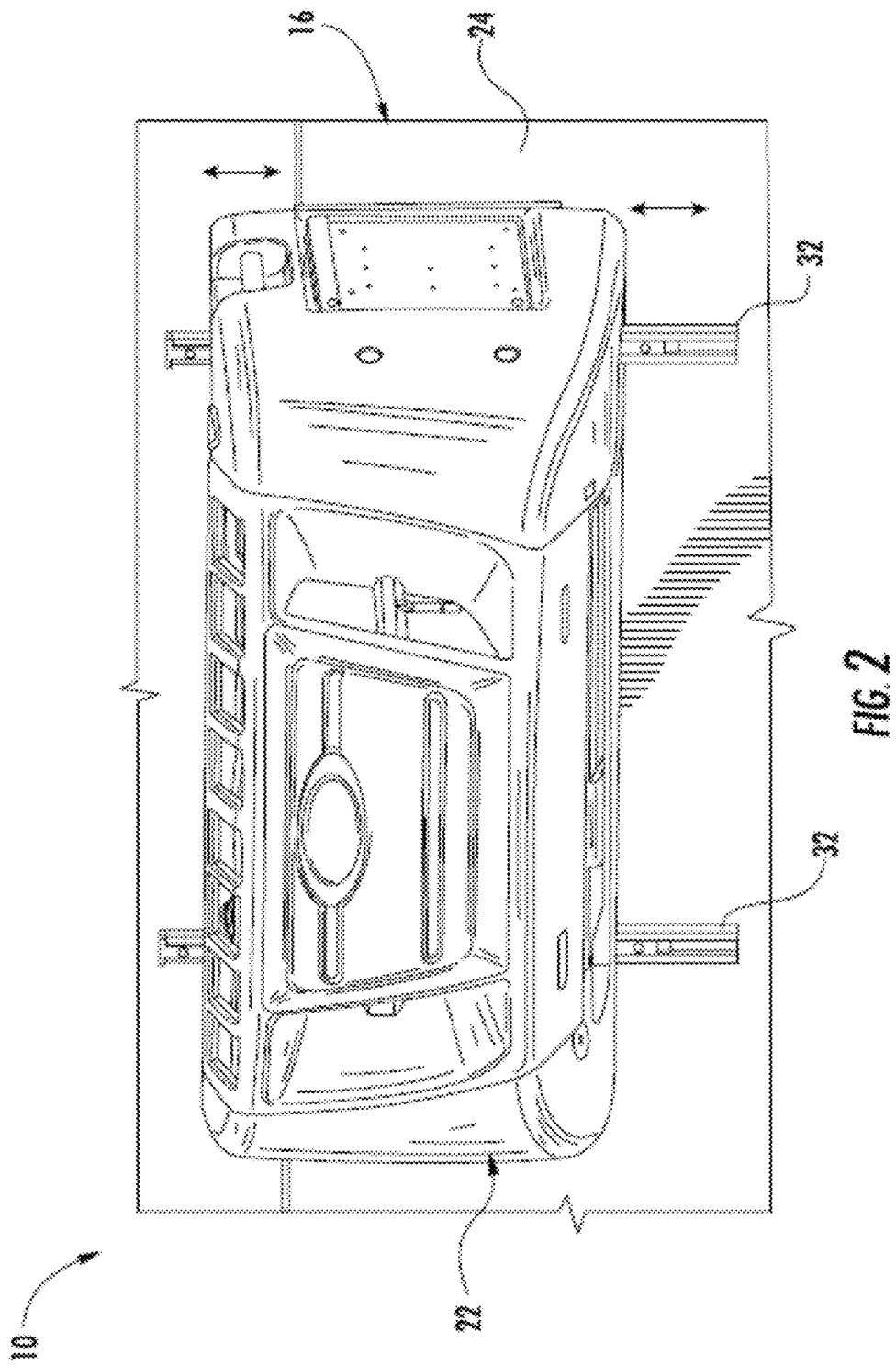
FIG. 2 is a front, perspective view of a condenser unit of the transportation refrigeration system according to an embodiment of the invention.

Referring now to FIG. 1, a side view of an example of a truck 10 including a transport refrigeration system 18 is illustrated. The truck 10 has an engine 12 and a conditioned cargo space 14 which is defined by a plurality of insulated wall members, including a forward wall member 16. The conditioned cargo space 14 is temperature controlled by the transport refrigeration system 18. The transport refrigeration system 18 includes an evaporator unit 20 disposed within the conditioned space 14, a condenser unit 22 mounted on the vertical front outside surface 24 of the forward wall member 16, and a refrigerant compressor 26 driven by the truck engine 12. The truck 10 includes a cabin 27 configured to house an operator of the truck 10. To access the engine 12, such as to perform maintenance for example, the cabin 27 is generally rotated forward, for example in the direction indicated by arrow R, away from the forward wall member 16.

Figure 3:
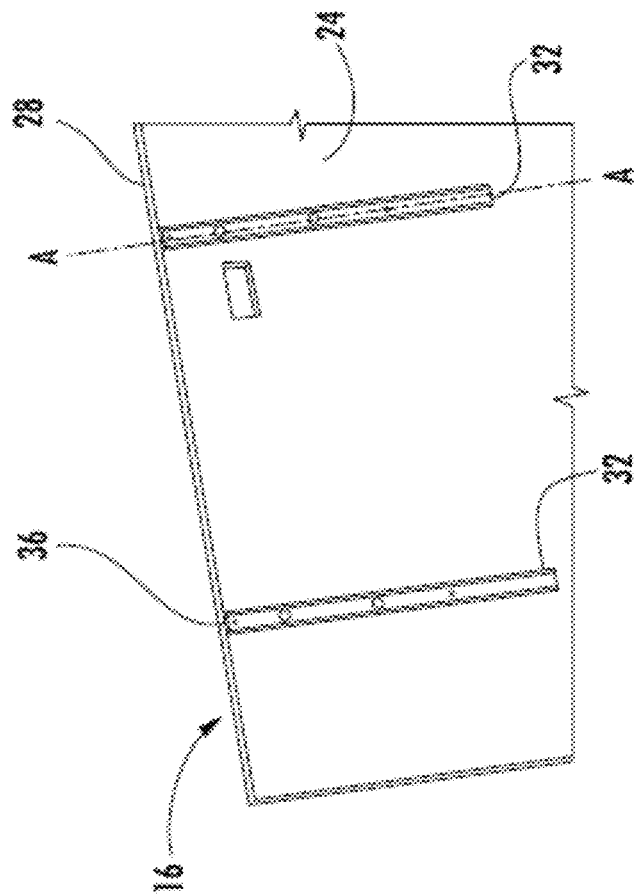
FIG. 3 is a perspective view of a front surface of a front wall member of the truck according to an embodiment of the invention.
Figure 4:
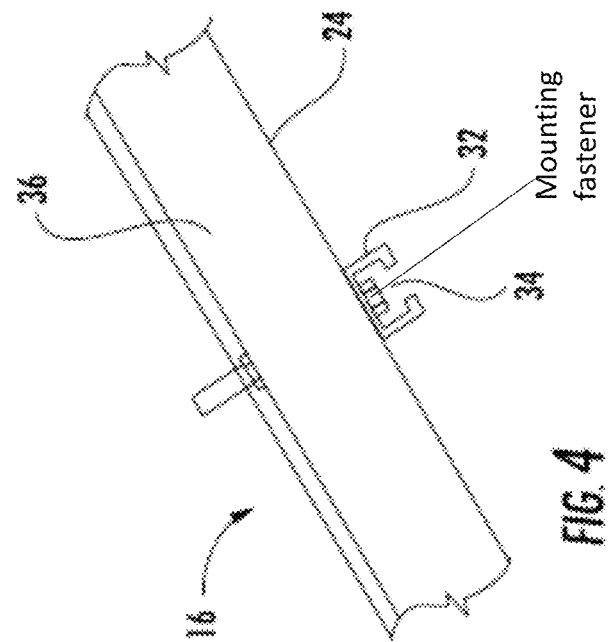
FIG. 4 is a top view of the front wall member of the truck of FIG. 3.

Referring now to FIGS. 2-8, an assembly for mounting the condenser unit 22 to the truck 10 is provided in more detail. As illustrated in FIGS. 3 and 4, connected to the surface 24 of the front wall member 16, such as with screws or other fasteners for example, is at least one support bracket 32. In embodiments where a plurality of support brackets 32 are mounted to the front wall member 16, the plurality of support brackets 32 are spaced apart from one another, and each of the support brackets 32 is substantially identical. In the illustrated, non-limiting embodiment, two support brackets 32 are mounted to the front wall member 16, and each support bracket 32 has a C shape that defines an opening 34 having a sliding axis A parallel to surface 24. Although a C-shape is illustrated and described, a support bracket 32 having another shape is within the scope of the invention. The one or more support brackets 32 are positioned such that a first end 36 of each support bracket 32 is generally aligned with a top end 28 of the front wall member 16.

Referring now to FIGS. 5-7, an example of a slide member 40 configured to mount to a surface (not shown) of the condenser unit 22 positioned opposite the surface 24 of the front wall member 16 is illustrated. The slide member 40 may have a shape generally complementary to the support bracket 32 and includes at least one pin 44 extending from a front, surface 42 thereof. The at least one pin 44 extends through a corresponding hole 46 (FIG. 7) in the condenser unit 22 to couple the slide member 40 to the condenser unit 22. Each slide member 40 may include a plurality of pins 44 to increase the strength of the connection formed between the slide member 40 and the condenser unit 22. The number of slide members 40 coupled to the condenser unit 22 is generally equal to the number of support brackets 32 mounted to the front wall member 16. In addition, the spacing between adjacent slide members 40 is substantially similar to the spacing between adjacent support brackets 32.

To connect the condenser unit 22 to the front wall member 16, each of the plurality of slide members 40 is slidably inserted into the opening 34 of a corresponding support bracket 32. The shape or contour of the support brackets 32 is configured to obstruct movement of the slide member 40 away from the plane of the surface 24. Although the slide members 40 are illustrated and described herein as being received within the opening 34 of the support brackets 32, other configurations, such as where the slide members 40 are arranged about an exterior of the support brackets 32 for example, are within the scope of the invention. In one embodiment, a first end 46 of each of the slide members 40 includes an oversized head 48. The oversized head 48 is generally larger than the opening 34 of the support bracket 32 and is configured to limit the downward movement of the slide member 40 relative to a support bracket 32. Therefore, when the oversized head 48 is in contact with the first end 36 of the support bracket 32, the condenser unit 22 is in its lowest possible mounted position relative to the surface 24.

Figure 9:
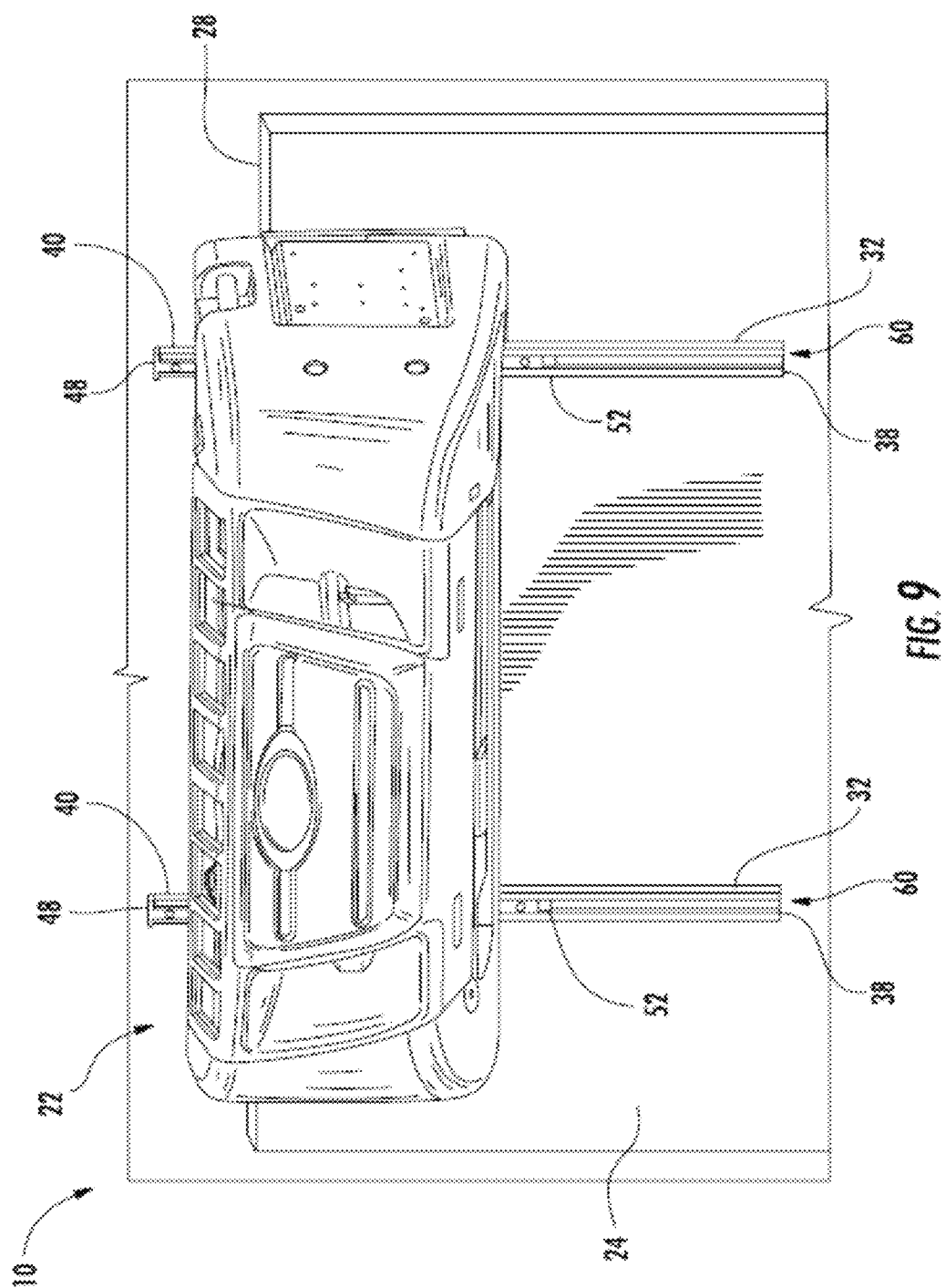
FIG. 9 is a front view of the condenser unit in a clearance according to an embodiment of the invention.

The slide members 40 are configured to slide along the sliding axis A, within the support brackets 32, such that the condenser unit 22 is movable between a first operating position (FIG. 7) and a second clearance position (FIG. 9). In one embodiment, the distance between the operating position and the clearance position is between 10 centimeters and 15 centimeters, but may alternatively exceed 20 centimeters. The condenser unit 22 is generally in the operating position when the truck 10 is being driven and the transport refrigeration system 18 is operational. The condenser unit 22 is generally moved to the clearance position when the cabin 27 of the truck 10 needs to be rotated forward, such as to perform maintenance on the engine 12 for example. In one embodiment, the condenser unit 22 is in the operating position when the condenser unit 22 is in the lowest possible mounted position. The one or more conduits (not shown) extending between the condenser unit 22 and the evaporator unit 20 are generally flexible such that as the condenser unit 22 moves between the operating position and the clearance position, the condenser unit 22 remains fluidly coupled to the evaporator unit 20 disposed within the conditioned space 14. As a result, the transport refrigeration system 18 is configured to operate even when the condenser unit 22 is in the clearance position.

When the condenser unit 22 is in the operating position, additional fasteners 50 (FIG. 6) may be installed through an opening (not shown) in the slide member 40 to couple each slide member 40 and an adjacent support bracket 32 to the front wall member 16. However, these additional fasteners 50 are removed before moving the condenser unit 22 between the operating position and the clearance position. In the illustrated, non-limiting embodiment, when the condenser unit 22 is in the clearance position, at least a portion of the slide members 40 extends above the top surface 28 of the front wall member 16.

As shown in FIGS. 8 and 9, a device 60 arranged at an end, such as the second end 38 for example, of each support bracket 32 is configured to move a corresponding slide member 40, and therefore the condenser unit 22, between the operating position and the clearance position. A first end 62 of the device 60 is arranged within the opening 34 in contact with a second end 52 of the slide member 40. The device 60 is movable between a retracted position and an extended position. As the device 60 moves between the retracted position and the extended position, a similar motion is transmitted to the slide member 40 within the support bracket 32. In one embodiment, illustrated in FIG. 8, the device 60 is a mechanical device, such as a screw for example. Manual rotation of the device 60 in a first direction causes the slide member 40 to move vertically upward along the slide axis A of the support bracket 32 and manual rotation of the device 60 in a second, opposite direction causes the slide member 40 to move vertically downward along the slide axis A of the support bracket 32. In another embodiment, the device 60 is an actuator, such as a hydraulic or electric actuator for example. A portion of the device 60 arranged in contact with the second end 52 of the slide member 40, for example a plunger, is configured to move in response to a signal to control the position of the slide member 40 within the support bracket 32. As a result, when the device 60 is in the retracted position, the condenser unit 22 is in the operating position, and when the device 60 is in the extended position, the condenser unit 22 is in the clearance position. Though the devices 60 are described as being arranged adjacent the second end 3 of the support brackets 32, other configurations, such as where the devices 60 are mounted at the first end 36 of the support brackets 32 for example, are within the scope of the invention.

By slidably mounting the condenser unit 22 to the surface 24 of the front wall member 16, the condenser unit 22 may be easily moved vertically between an operating position and a clearance position. When the condenser unit 22 is in the clearance position, sufficient clearance exists such that the cabin may be rotate freely to allow for maintenance of the engine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A truck comprising:
   an engine;
   a cabin;
   a conditioned space defined by a plurality of adjacent wall members including a front wall member; and
   a transport refrigeration unit configured to control a temperature within the conditioned space, the transport refrigeration unit including:
   an evaporator unit mounted within the conditioned space; and a condenser unit operably coupled to the evaporator unit and slidably mounted to an exterior surface of the front wall member such that the condenser unit is configured to move between an operating position and a clearance position;

a support bracket mounted to the exterior surface and configured to define a slide axis; and a slide member coupled to the condenser unit, the slide member being generally complementary to the support bracket and configured to slidably couple to the support bracket for movement along the slide axis.

2. The truck according to claim 1, wherein the cabin is configured to rotate in a direction away from the condenser unit, and when the condenser unit is in the operating position, the condenser unit interferes with a path of rotation of the cabin.

3. The truck according to claim 2, wherein when the condenser unit is in the clearance position, the condenser unit is spaced away from the path of rotation of the cabin, such that the cabin may freely rotate.

4. The truck according to claim 1, wherein the slide member has at least one pin extending outwardly from a first surface thereof, the at least one pin being configured to extend through a complementary hole in the condenser unit.

5. The truck according to claim 1, wherein the support bracket is mounted to the exterior surface of the front wall member with at least one fastener.

6. The truck according to claim 1, wherein the support bracket is generally positioned such that a first end of the support bracket is aligned with a first end of the front wall member.

7. The truck according to claim 1, wherein when the condensing unit is in the operating position, a fastener couples the slide member and the support bracket to the front wall member.

8. The truck according to claim 1, wherein when the condensing unit is in the clearance position, a portion of the slide member extends beyond a first end of the front wall member.

9. The truck according to claim 1, wherein the support bracket includes an opening within which the slide member is received.

10. The truck according to claim 1, further comprising a device coupled to the support bracket, the device being configured to move the slide member along the slide axis.

11. The truck according to claim 10, wherein the device is a manual mechanical device.

12. The truck according to claim 11, wherein the device is a screw.

13. The truck according to claim 10, wherein the device is an actuator.

14. The truck according to claim 1, wherein a distance between the operating position and the clearance position is between about 10 centimeters and about 15 centimeters.

15. The truck according to claim 1, wherein a distance between the operating position and the clearance position is greater than or equal to about 20 centimeters.

16. A method of moving a condenser unit of a transport refrigeration system between an operating position and a clearance position, the condenser unit including a slide member slidably coupled to a support bracket mounted to a front wall member of a truck, comprising:

moving the slide member relative to the support bracket along a slide axis, wherein moving the slide member occurs in response to a signal.

17. The method according to claim 16, further comprising removing at least one fastener connecting the slide member and the support bracket to the front wall member.

\* \* \* \* \*